(12) United States Patent
Durnin et al.

(10) Patent No.: US 6,688,743 B1
(45) Date of Patent: Feb. 10, 2004

(54) METHOD AND APPARATUS TO DETERMINE FLY HEIGHT OF A RECORDING HEAD

(76) Inventors: James E. Durnin, 13770 Flagstaff Ave., Apple Valley, MN (US) 55124; Edward C. Gage, 145050 Flintwood Ct., Apple Valley, MN (US) 55124; Gregory S. Mowry, 18 Geneva Blvd., Burnsville, MN (US) 55306

(*) Notice: Subject to any disclaimer, the term of this patent is extended or adjusted under 35 U.S.C. 154(b) by 0 days.

(21) Appl. No.: 09/155,460
(22) PCT Filed: Sep. 29, 1998
(86) PCT No.: PCT/US98/20311
  § 371 (c)(1),
  (2), (4) Date: Sep. 29, 1998
(87) PCT Pub. No.: WO99/41566
  PCT Pub. Date: Aug. 19, 1999

Related U.S. Application Data
(60) Provisional application No. 60/074,966, filed on Feb. 17, 1998.

(51) Int. Cl.⁷ .............................................. G01B 27/40
(52) U.S. Cl. .................... 356/369; 356/624; 250/201.5; 369/47.38
(58) Field of Search ................................ 356/609, 624, 356/507, 369; 250/201.5; 369/47.38

(56) References Cited

U.S. PATENT DOCUMENTS

| | | | |
|---|---|---|---|
| 3,980,811 A | 9/1976 | Schaefer et al. | 178/6.6 R |
| 4,229,067 A | 10/1980 | Love | 350/96.15 |
| 4,310,916 A | 1/1982 | Dil | 369/109 |
| 4,443,700 A | 4/1984 | Macedo et al. | 250/227 |
| 4,569,038 A | 2/1986 | Nagashima et al. | 369/44 |
| 4,581,529 A | 4/1986 | Gordon | 250/227 |
| 4,706,235 A | 11/1987 | Melbye | 369/46 |
| 4,769,800 A | 9/1988 | Moser et al. | 369/32 |
| 4,801,794 A * | 1/1989 | Kowalski et al. | 250/201.5 |
| 4,815,064 A | 3/1989 | Melbye | 369/59 |
| 4,933,537 A | 6/1990 | Takahashi et al. | 235/454 |
| 4,994,658 A | 2/1991 | Takahashi et al. | 235/473 |
| 5,004,307 A | 4/1991 | Kino et al. | 350/1.2 |
| 5,096,277 A | 3/1992 | Kleinerman | 385/12 |
| 5,125,750 A | 6/1992 | Corle et al. | 359/819 |
| 5,138,676 A | 8/1992 | Stowe et al. | 385/32 |
| 5,153,870 A | 10/1992 | Lee et al. | 369/111 |
| 5,193,132 A | 3/1993 | Uken et al. | 385/32 |
| 5,212,379 A | 5/1993 | Nafarrate et al. | 250/227.14 |
| 5,278,812 A | 1/1994 | Adar et al. | 369/44.12 |
| 5,280,340 A | 1/1994 | Lacey | 356/357 |
| 5,286,971 A | 2/1994 | Betzig et al. | 250/227.26 |
| 5,363,463 A | 11/1994 | Kleinerman | 385/123 |
| 5,424,834 A * | 6/1995 | Akedo et al. | 356/609 |
| 5,450,203 A | 9/1995 | Penkethman | 356/373 |
| 5,457,534 A | 10/1995 | Lacey et al. | 356/357 |
| 5,486,924 A * | 1/1996 | Lacey | 356/507 |
| 5,493,393 A | 2/1996 | Beranek et al. | 356/328 |
| 5,497,359 A | 3/1996 | Mamin et al. | 369/44.15 |
| 5,535,189 A | 7/1996 | Alon et al. | 369/102 |
| 5,537,385 A | 7/1996 | Alon et al. | 369/119 |
| 5,557,597 A * | 9/1996 | Lee et al. | 250/201.5 |
| 5,566,159 A | 10/1996 | Shapira | 369/99 |
| 5,574,712 A | 11/1996 | Alon et al. | 369/102 |
| 5,592,444 A | 1/1997 | Alon et al. | 369/13 |
| 5,598,393 A | 1/1997 | Alon et al. | 369/102 |
| 6,307,627 B1 * | 10/2001 | Vurens | 356/369 |

* cited by examiner

Primary Examiner—Richard A. Rosenberger

(57) ABSTRACT

The invention features a fly height measurement system for measuring fly height of a slider over a storage disc. The fly height measuring system includes a source of light, a slider, a detector module and a processor. The source of light produces light along a light path. The slider includes an objective lens positioned such that light from said source hits the objective lens and is directed toward a surface of a disc. Light propagating from the disc is directed to a detector. The processor estimates the fly height of the slider based on detector module output.

19 Claims, 10 Drawing Sheets

METHOD AND APPARATUS TO DETERMINE FLY HEIGHT OF A RECORDING HEAD

CROSS REFERENCE TO RELATED APPLICATIONS

This application claims priority to provisional application Serial No. 60/074,966, filed on Feb. 17, 1998 and is a §371 National Stage Application of International Application No. PCT/US98/20311, filed Sep. 29, 1998 and published as WO99/41566 on Aug. 19, 1999 in English.

BACKGROUND OF THE INVENTION

The present invention relates to disc storage systems of the type used to store information. More specifically, the invention relates to an apparatus for determining fly height in a head/gimbal assembly of such a disc storage system.

Disc storage systems are known in the art and are used to store information for later retrieval. Such disc storage systems include a rotating disc which carries information thereon. A transducing head (or, in some instances, a read back head) is positioned over a surface of the disc while the disc rotates at high speed. The head is carried on a slider which is designed to "fly" just over the surface of the rotating disc. The head may then be used to write information from the disc. Such information may be, for example, magnetically or optically encoded of the disc surface.

Increased storage density is becoming increasingly important. One technique known to increase storage density is to decrease the "fly height" of the head. Fly height is defined as the distance between the disc surface and the head or slider during operation of the storage system. A reduced fly height allows information to be written or read back more precisely and such information can be stored in a smaller area (i.e., at a higher density).

Various techniques have been used in the art to measure the fly height of the head. For example, if a disc is designed to operate with a certain fly height, typically, this fly height must be measured in order to ensure that the system is operating within specification. Commonly, the fly height is measured before assembling the head and slider assemblies into disc drives. One technique to measure fly height is by measuring electrical capacitance between the head and the disc. Another common technique to measure fly height is using optical interferometry in which a transparent test disc is used to fly the slider. Light is shined through the disc onto the slider from a source on the other side of the disc. Using known techniques, the reflected light can be examined to determine fly height. U.S. Pat. No. 5,280,340, issued Jan. 18, 1994 to Lacy describes a number of such techniques for measuring fly height.

Another technique used to measure and characterize a head is to measure the read back signal provided by the head during operation. The signal can be examined for many different parameters, including signal strength, intersymbol interference, off-track sensitivity, etc. For example, U.S. Pat. No. 5,068,754, issued Nov. 26, 1991 describes a method and apparatus for measuring bit shift in a magnetic disc drive.

Optical discs provide an alternative to purely magnetic based recording media. Optical disc drives can be used to obtain high storage densities. An approach to increase the storage density involves reducing the spot size using near-field recording. Near-field recording involves optical components mounted on a slider within a distance roughly on the order of a wavelength or less of the surface of the disc. Then, the energy transmitted through the optics is transferred to the surface of the disc through evanescent coupling. A Solid Immersion Lens (SIL) or the like can be used along with an objective lens to produce an ultra small spot.

In general, in optical storage systems, data is in the form of marks carried on the surface of the disc which are detected using the reflected laser light. There are a number of different optical disc technologies which are known in the industry. For example, compact discs are currently used to store digital data such as computer programs or digitized music. Typically, compact discs are permanently recorded during manufacture. Another type of optical system is a write-once read-many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the storage medium.

SUMMARY OF THE INVENTION

The invention features a measurement system for estimating the fly height of a recording head relative to a spinning disc. Several properties of the light reflected from the spinning disc depend on distance of the recording head to the spinning disc. The fly height measurement system includes a source of light, a slider, a detector module and a processor. The slider includes an objective lens positioned such that light from the source hits the objective lens and is directed to the surface of the disc.

In a first configuration, the detector module receives light reflected from the disc. The processor estimates the fly height of the slider based on detector module output. In an alternative configuration, the detector module receives light transmitted through the disc. The transmitted light is not spatially dispersed based on wavelength. Again, the processor estimates the fly height based on detector module output.

In another aspect, the invention features a method of determining fly height of a slider relative to spinning disc comprising:
a) directing light to an objective lens located on the slider;
b) measuring a property of light propagating from a disc with a detector module positioned to receive the propagating light, where light directed at the detector is not spatially dispersed based on wavelength; and
c) estimating the fly height based on the output of the detector.

The detector module for performing the method can include a lens and a two element detector and wherein the fly height is estimated by evaluating the difference in signals from the two elements of the detector and comparing the difference with values from a standard curve. In other embodiments of the method, the detector module comprises a polarization beam splitter and two light sensitive elements each configured to measure one component of the split beam. In other embodiments, the detector module comprises a detector array, and wherein the fly height is estimated by examining an intensity distribution, a phase distribution or a polarization distribution measured by the detector array.

DETAILED DESCRIPTION OF THE PREFERRED EMBODIMENTS

A slider with an objective lens can be used to obtain the distance, i.e. fly height, from the slider to a spinning disc. Only a single source of monochromatic or quasi-monochromatic light is needed. The distance between the slider and the disc is held approximately constant to make the measurement. Light propagating from the disc is directed to a detector. For example, light reflected from the disc back through the objective lens can be directed by a beam splitter to a detector. Alternatively, the light transmitted through the disc can be directed to a detector.

The detector measures one or more properties of the reflected (transmitted) light. Suitable properties for obtaining the distance measurement include polarization, intensity distribution and/or phase distribution, for example. The properties are correlated with distance properties such that using subsequent measurements a microprocessor can monitor the detector output and provide an output related to fly height.

This approach to fly height measurements is particularly suitable for measuring fly heights for optical recording heads since sliders for optical recording heads generally are equipped with an objective lens and possibly other suitable optics. Nevertheless, other recording heads can include sliders that are equipped with an objective lens and other optics as desired to perform the distance measurements. Thus, the specifications of a magnetic disc drive system can be measured with the approaches described herein.

Particularly suitable optical recording heads include near-field optical recording heads. Near-field optical recording heads have a fly height generally on the order of a wavelength of light or less. The optics mounted on the slider are coupled to the surface of the disc through evanescent coupling due to the small separation. The slider optics generally include an objective lens that focuses the light onto, or slightly below, the bottom surface of the slider. The slider optics on near-field recording heads generally also include a Solid Immersion Lens (SIL) or the like to reduce spot size.

Figure 1A:
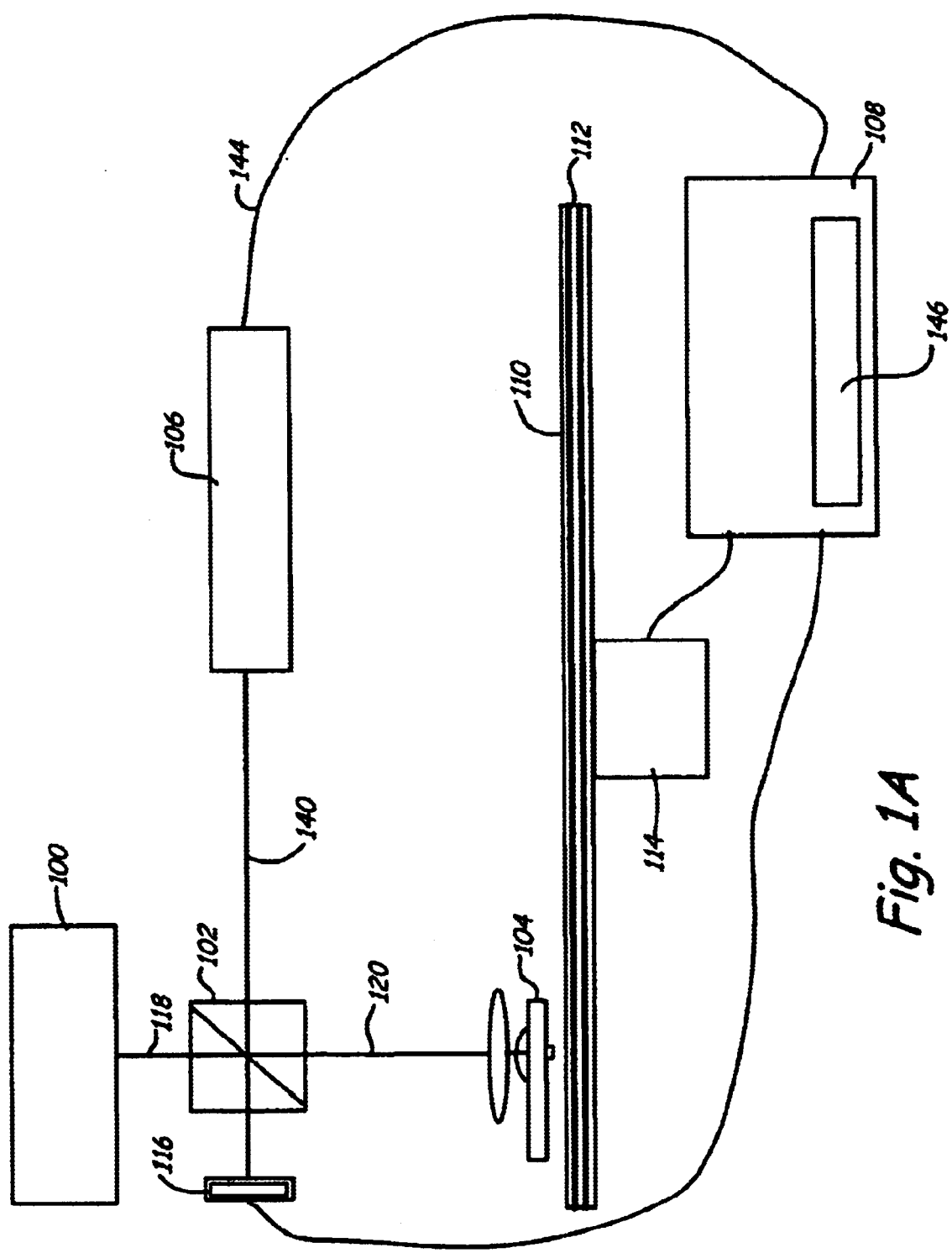
FIG. 1A is a schematic diagram depicting a measuring system for determining the distance of a slider relative to a spinning disc.

Referring to FIG. 1A, an embodiment of a measurement system to measure light reflected from the disc includes a light source 100, a beam splitter 102, a slider 104, a detector module 106 and processor 108. The measurement system is positioned relative to a disc spinning system with slider 104 near the surface 110 of a disc 112 when the disc is in position. The disc spinning system includes a motor 114 such as a spindle motor for spinning disc 112. The measurement system optionally can include a power meter 116 positioned to receive a portion of the incident light from source 100 reflected by beam splitter 102.

Figure 1B:
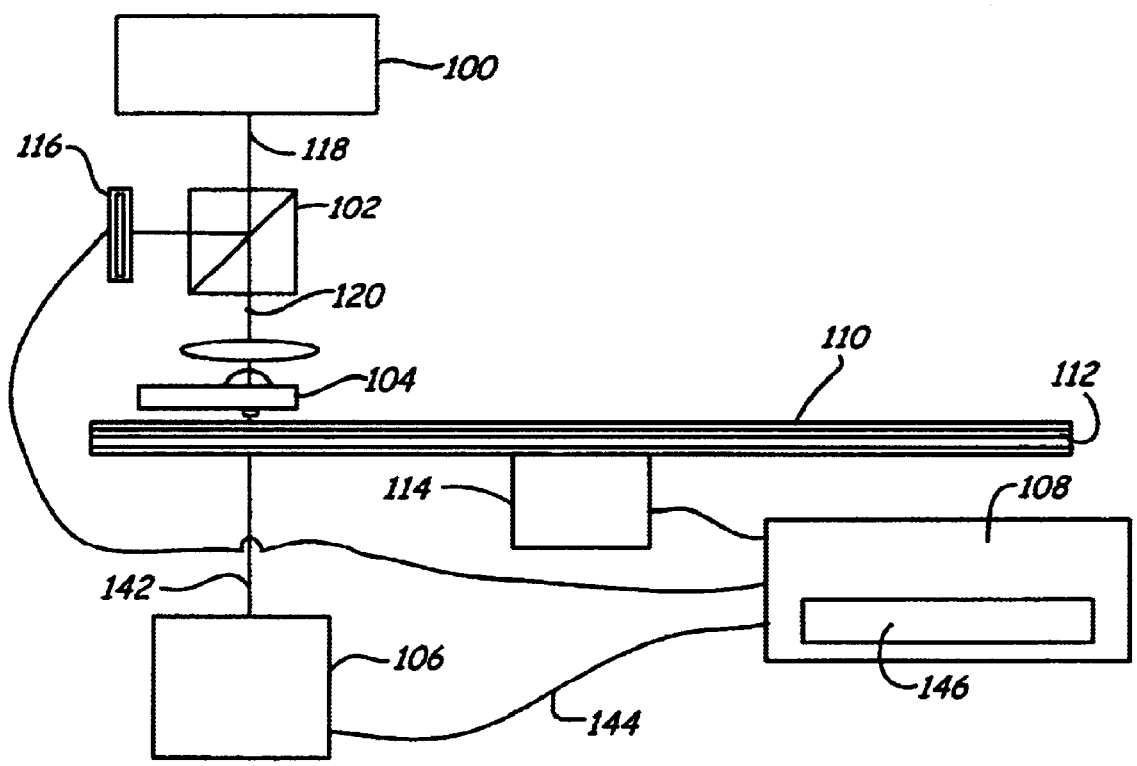
FIG. 1B is a schematic diagram depicting an alternative embodiment of a measuring system for determining the distance of a slider relative to a spinning disc.

In an alternative embodiment shown in FIG. 1B, the measurement system is configured to measure light transmitted through the disc 112. In this alternative embodiment, beam splitter 102 can be removed or replaced with a polarizer. Additional optical elements, such as mirrors and lenses, can be used to direct the transmitted light to the detector as desired.

Light source 100 generally outputs monochromatic or quasi-monochromatic light along light path 118. Suitable light sources include a mercury arc lamp, a light emitting diode, a diode laser and the like. Light path 118 passes through beam splitter 102. Transmitted light follows split light path 120. A partial polarizing beam splitter can be used if the detection system is sensitive to polarized light. Even if the light source 100 is polarized, a polarizing beam splitter can be used to increase the polarization ratio, for example, if the polarization-ratio ($I_p$ to $I_s$) of the source is relatively low, such as a laser diode with a polarization ratio of about 100 to 1. If a partial polarizing beam splitter is used, transmitted light along split light path 120 is partially plane polarized. Light with partially orthogonal polarization is reflected at 90 degrees relative to the incident direction. The reflected incident light is directed to power meter 116, if desired.

Figure 2:
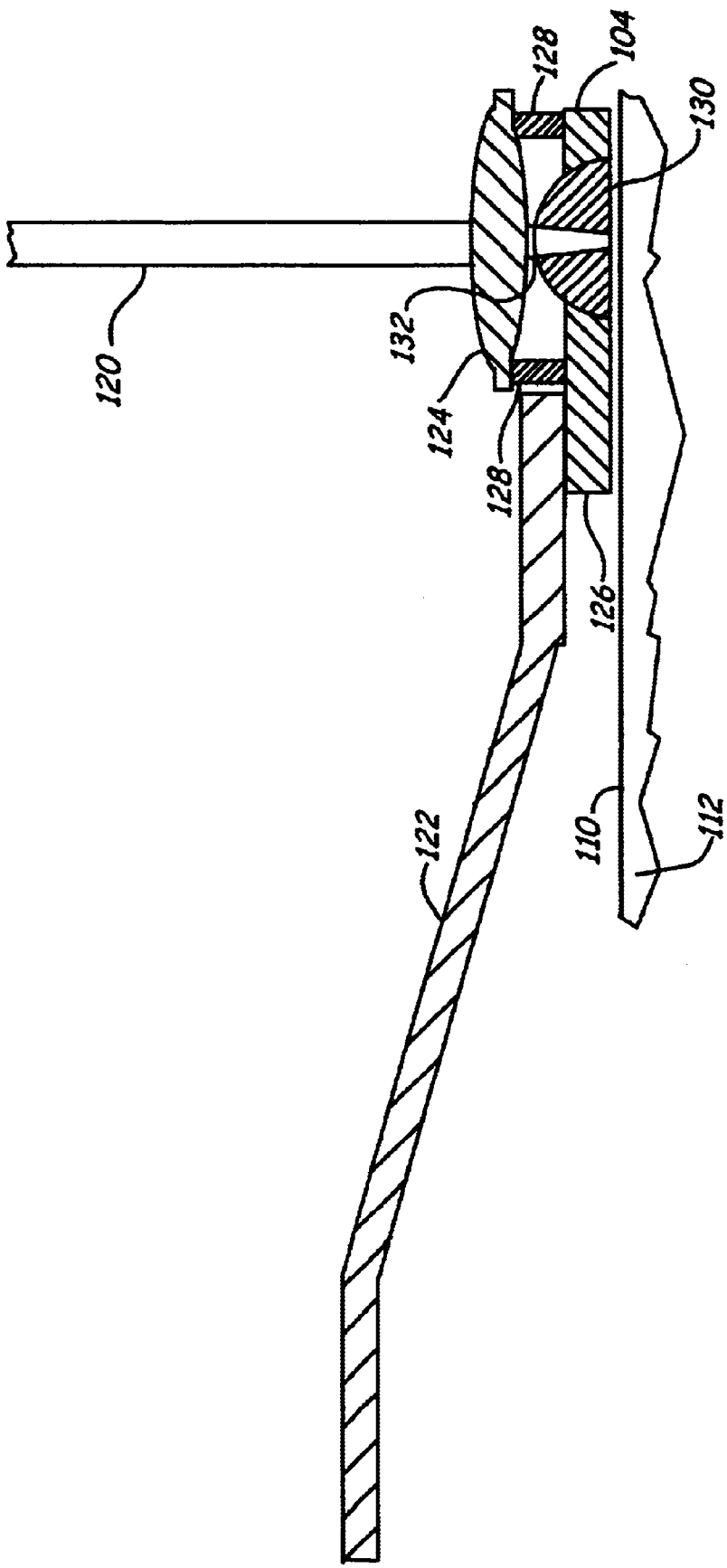
FIG. 2 is a sectional, side view of a slider and its support arm with the cross section taken through the center of the slider.

Transmitted light continues along light path 120 to slider 104. Referring to FIG. 2, slider 104 generally is at the end of arm 122, which can be a flexure spring suspension arm.

Slider 104 includes an objective lens 124. Objective lens 124 can be mounted on slider base 126 using spacers 128. Slider 104 optionally includes slider optics 130. Slider optics 130 help to optically couple objective lens 124 with the surface of disc 110 to minimize distortions due to changing index of refraction. Suitable slider optics 130 include Solid Immersion Lenses (SILs) or the like. Preferred sliders are part of near-field optical recording heads. Objective lens 124 is placed within split light path 120 and creates a focused light path 132.

Referring to FIG. 1A, light passing through the optical elements of slider 104 reflects from surface 110 of disc 112. The reflected light is passed back through the optical elements of slider 104 including objective lens 124. The reflected light continues to beam splitter 102. At beam splitter 102, a portion of the reflected light is directed at a 90 degree angle along detection path 140, as shown in FIG. 1A. Detection path 140 intersects detector module 106.

With an appropriate disc, a portion of the light is transmitted through disc 112. In the alternative embodiment of FIG. 1B, transmitted light path 142 is directed to detector 106.

Disc 112 generally is a test disc specifically designed for the distance measurement. The surface characteristics can be selected based on the properties of the detector module 106 and the corresponding type of measurement. In particular, surface 110 of disc 112 can be transparent or reflecting. Furthermore, surface 110 of disc 112 can have a coating, if appropriate. A pre-embossed media such as those with pits and grooves can be used, if desired. Also, a portion of a data storage disc can have a specific portion reserved for use as a test disc.

In particular, one embodiment of disc 112 is a reflecting, aluminum coated disc. The aluminum coated disc can optionally include a thin layer of an optically transparent material such as SiN. The thin film generally would have a thickness on the order of a wavelength or less. The thickness of the SiN layer alters the properties of the reflected light. Additionally, the air-incident surface of the SiN can be coated with a lubricant.

Another embodiment of disc 112 includes a glass disc, with or without a thin-film layer such as SiN. For this type of disc, reflectivity is a particularly suitable measurement for determining fly height. A third embodiment of test disc 112 is a glass or aluminum coated disc with an optical stack containing magneto-optical (MO) media.

Several properties of the reflected (transmitted) light vary depending on the distance of slider 104 to disc 112. Detector module 106 can include elements to measure one or more of these distance dependent properties and provide an output to processor 108, for example, by way of cable 144. If necessary, a analog-to-digital converter or other signal conditioners can be included to prepare the signal for processor 108. The selection of a suitable detection approach and test disc may be based on the acceptable tolerances in fly height and the ranges of expected deviation from acceptable values of fly height.

To perform the measurements, the disc is spun at a fixed speed. After a brief transient period, the slider obtains a relatively constant height above the disc surface. The measurements then are performed. The optical head is aligned with the light path by maximizing the light reflected back into the detector module. In general, the output of detector modules set forth herein are correlated to fly height. Using an alternative fly height measurement technique, the correlation is obtained, which can be stored in memory 146 of processor 108.

Figure 3:
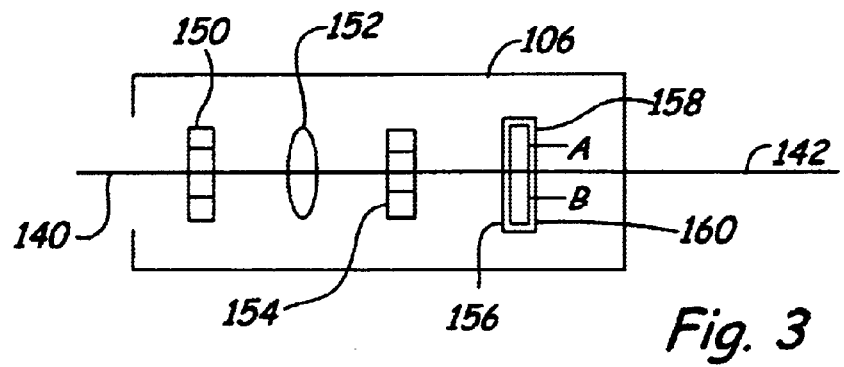
FIG. 3 is a schematic side view of an embodiment of a detector module with two light sensitive elements for use in the measuring system of FIG. 1, where any covering is made transparent to expose the internal components of the detector module.
Figure 4:
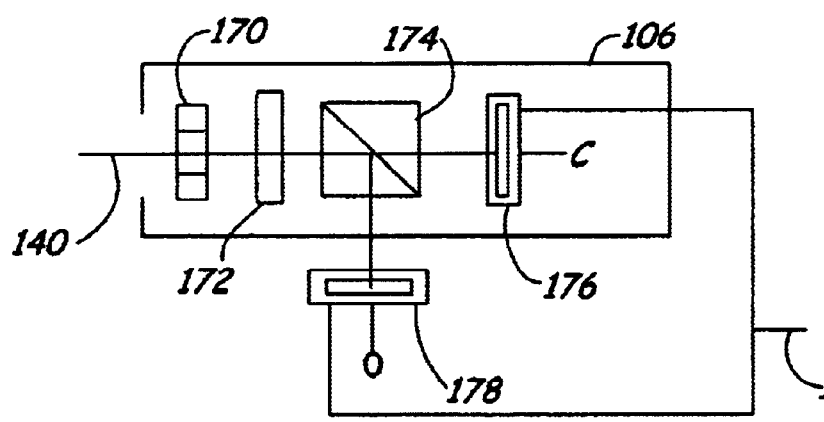
FIG. 4 is a schematic side view of an embodiment of a detector module with a polarization beam splitter for use in the measuring system of FIG. 1, where any covering is made transparent to expose the internal components of the detector module.
Figure 5:
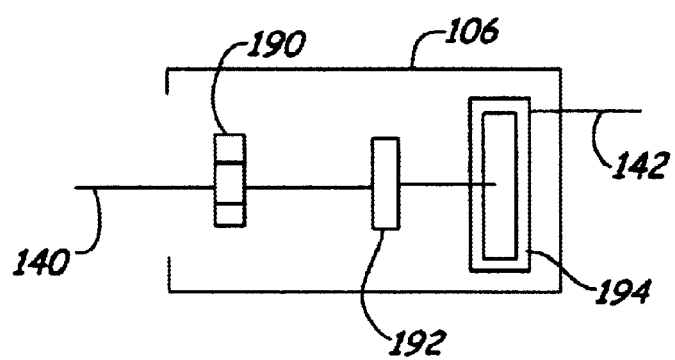
FIG. 5 is a schematic side view of an embodiment of a detector module incorporating an array detector for use in the measuring system of FIG. 1, where any covering is made transparent to expose the internal components of the detector module.

Three embodiments of detector module 106 are shown in FIGS. 3–5. Referring to FIG. 3, a first embodiment of detector module 106 includes an optional slit aperture 150, a lens 152, an optional iris diaphragm 154 and a two element detector 156. Slit aperture 150 can reduce noise. Lens 152 focuses light onto detector 156. Optional iris diaphragm 154 can be placed either before or after lens 152 in the light path. In FIG. 3, iris diaphragm 154 is placed after lens 152 between lens 152 and two element detector 156. Iris diaphragm 154 can be used as a central aperture stop such as a half aperture (50%) stop. Iris diaphragm 154 generally reduces the contribution of reflected light near normal incidence with respect to the disc surface to enhance the contribution of light waves having higher angles of incidence.

Two element detector 154 has light sensitive elements 158 (A), 160 (B). A focus signal can be defined as the difference between the measurements on the two light sensitive elements, focus signal=A−B. The focus signal can be correlated with the distance of the disc 110 to slider 104.

A second embodiment of detector module 106 is depicted in FIG. 4. In this embodiment, detector module 106 includes a central aperture stop 170 such as an iris diaphragm, an optional waveplate 172, a polarization beam splitter 174, and light sensitive elements 176 (C) 178 (D). Different polarizations generally reflect differently from the surface of disc 110. The difference in reflectivity generally depends on the distance between slider 104 and disc 110. The difference in reflection properties of the polarized light manifest themselves in the differences in the measurements of light sensitive elements 176, 178. These differences can be expressed as a polarization ratio=C/D or as a polarization difference C−D. This configuration of detector module 106 also can be used to obtain a value proportional to the total amount of reflected light by adding the measurements of elements 176, 178 (C+D). Waveplate 172 can be used to alter the polarization of the light following path 140 prior to striking polarization beam splitter 174. For example, the waveplate can be a half waveplate placed at 22.5 degrees or a quarter waveplate placed at 45 degrees.

Figure 6:
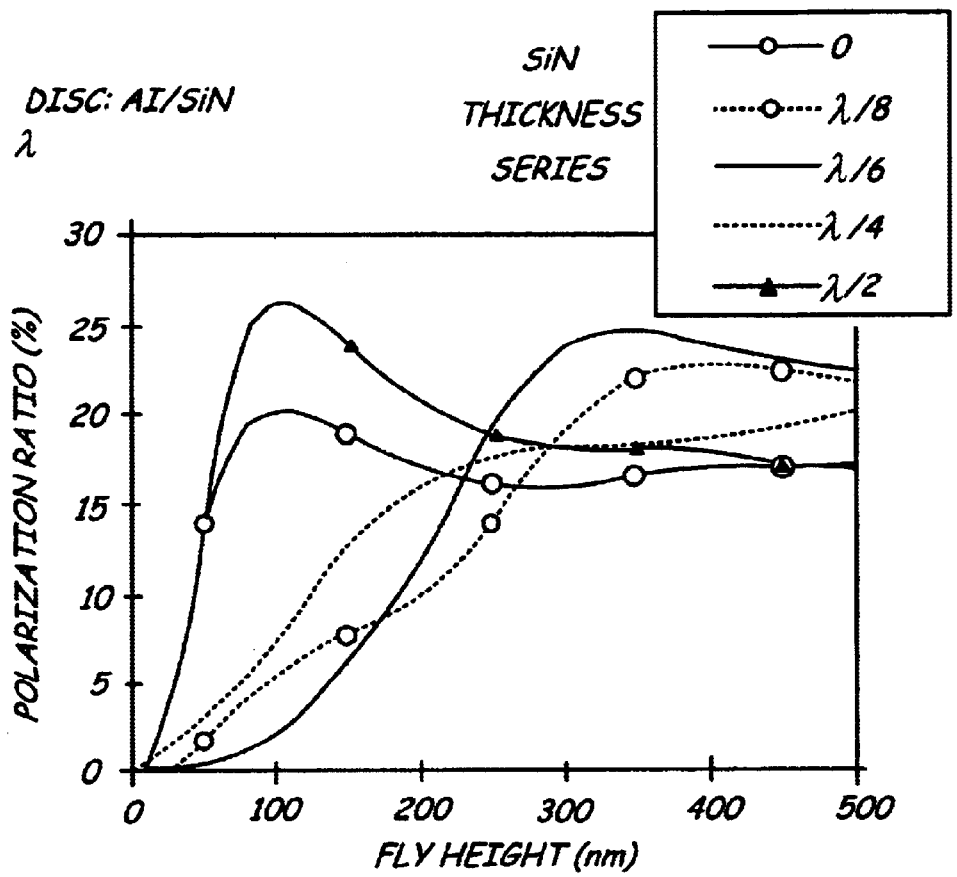
FIG. 6 is a plot of polarization ratio as a function of fly height for five different SiN thicknesses on the surface of an aluminum coated test disc.

Referring to FIG. 6, polarization ratio as a function of fly height was evaluated with an aluminum coated test disc using a experimental arrangement shown schematically in FIG. 1A. The polarization ratio is defined as the ratio of y-polarized light to x-polarized light in the reflected beam when the incident light is purely x-polarized. The objective lens had a numerical aperture of 0.65, and the SIL had a numerical aperture of 2.15. The RIM intensity at the objective lens was 0.28.

Figure 7:
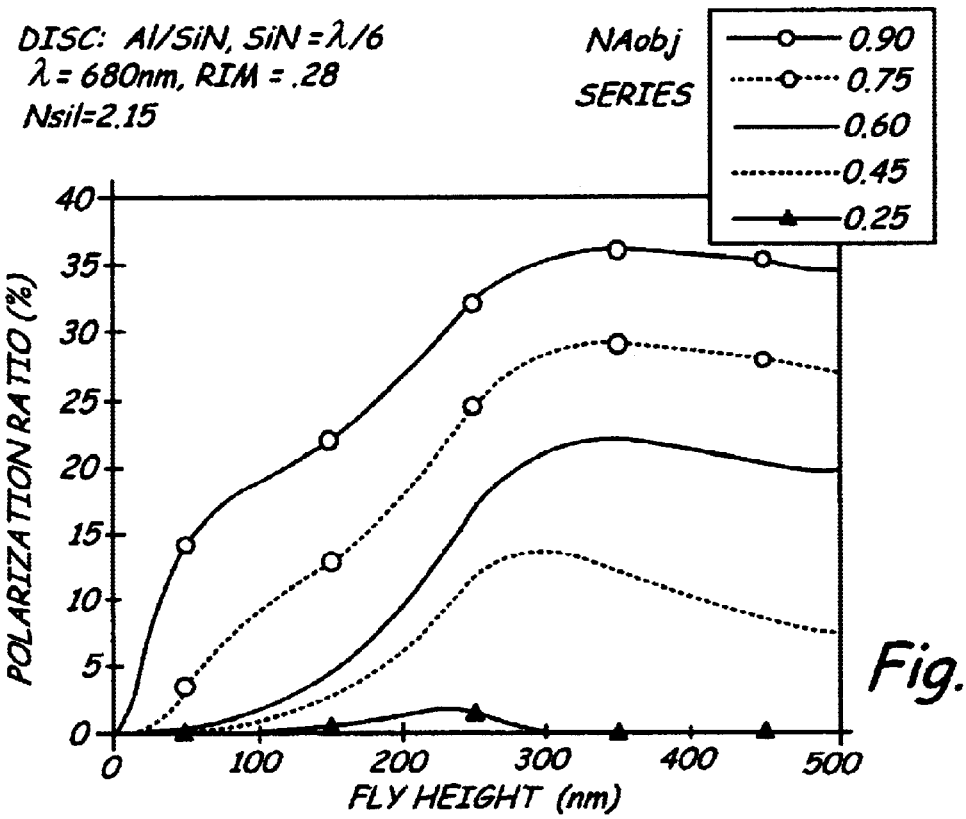
FIG. 7 is a plot of polarization ratio as a function of fly height for different numerical apertures of the objective lens.

As shown in FIG. 6, the effect of SiN thickness on the aluminum coated disc also was evaluated with respect to the polarization ratio (PR) as a function of fly height. Different SiN thicknesses produce PR curves as functions of fly height with different effective ranges corresponding to regions over which the curve changes monotonically. Once the correlation between fly height and PR has been established, this correlation can be-stored and used in subsequent fly height measurements. Similarly, using a zoned disc with several different SiN thicknesses, fly height can be measured over a 500 nm range with good accuracy without requiring monotonic curves for a particular SiN thickness over the effective range. Referring to FIG. 7, measurements obtained with different numerical apertures of the objective lens demonstrate that the technique accommodates a wide range of numerical apertures.

Figure 8:
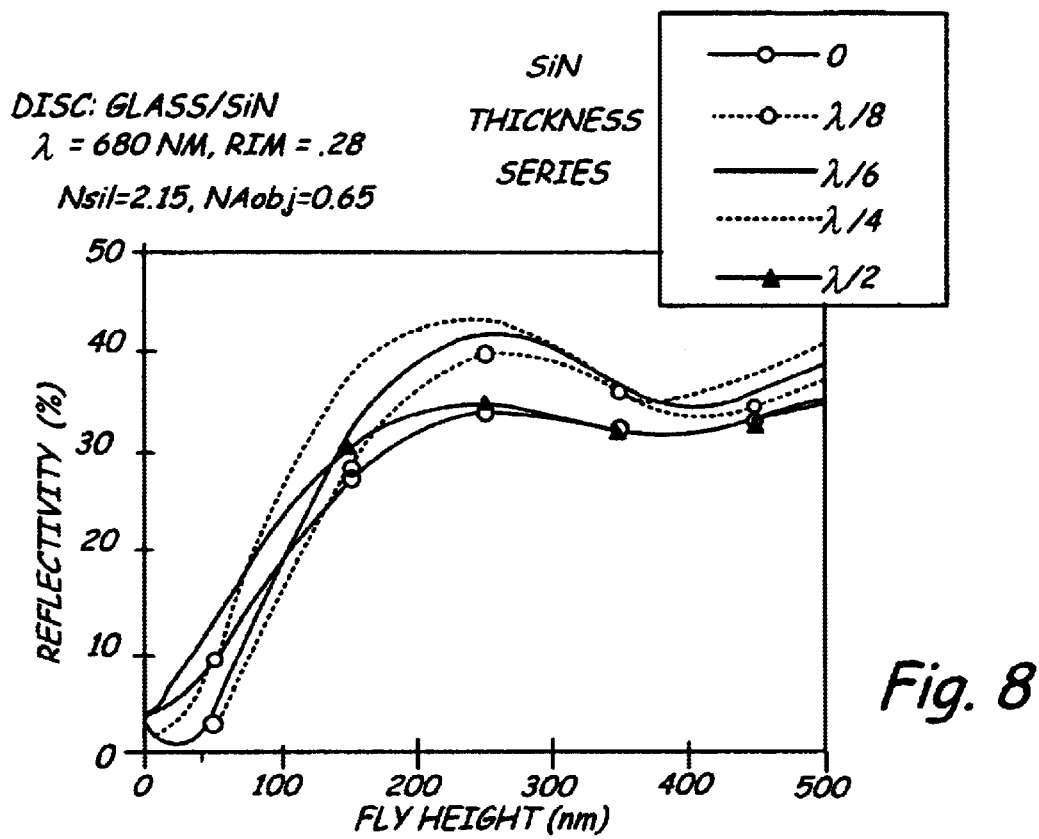
FIG. 8 is a plot of percent reflectivity as a function of fly height for five different SiN thicknesses on a glass test disc.
Figure 9:
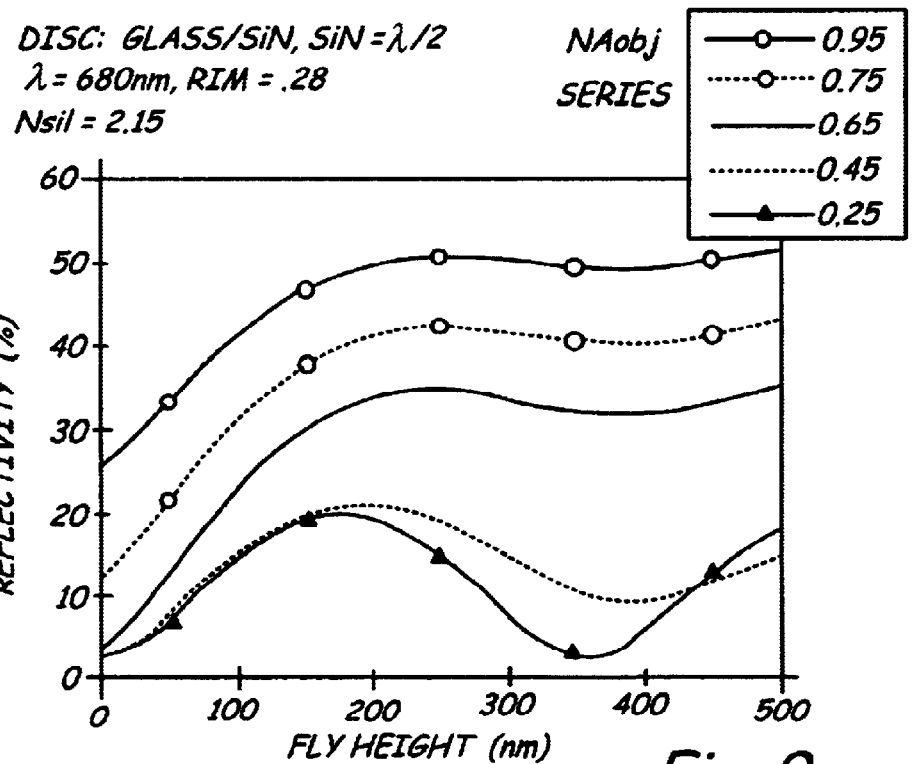
FIG. 9 is a plot of percent reflectivity as a function of fly height for five different numerical apertures of the objective lens.

Measurement of percent reflectivity as a function of fly height are plotted in FIG. 8 for five different thicknesses of SiN. The reflectivity was measured relative to the measurement of a power meter corresponding to element 114 of FIG. 1. The reflectivity curve has a monotonic range of about 250 nm for the particular numerical aperture of the objective lens. Referring to FIG. 9, the effective range of the reflectivity measurements is a mild function of numerical aperture since the fly height at the first maximum of the reflectivity does not change significantly for different values of numerical aperture.

Figure 10:
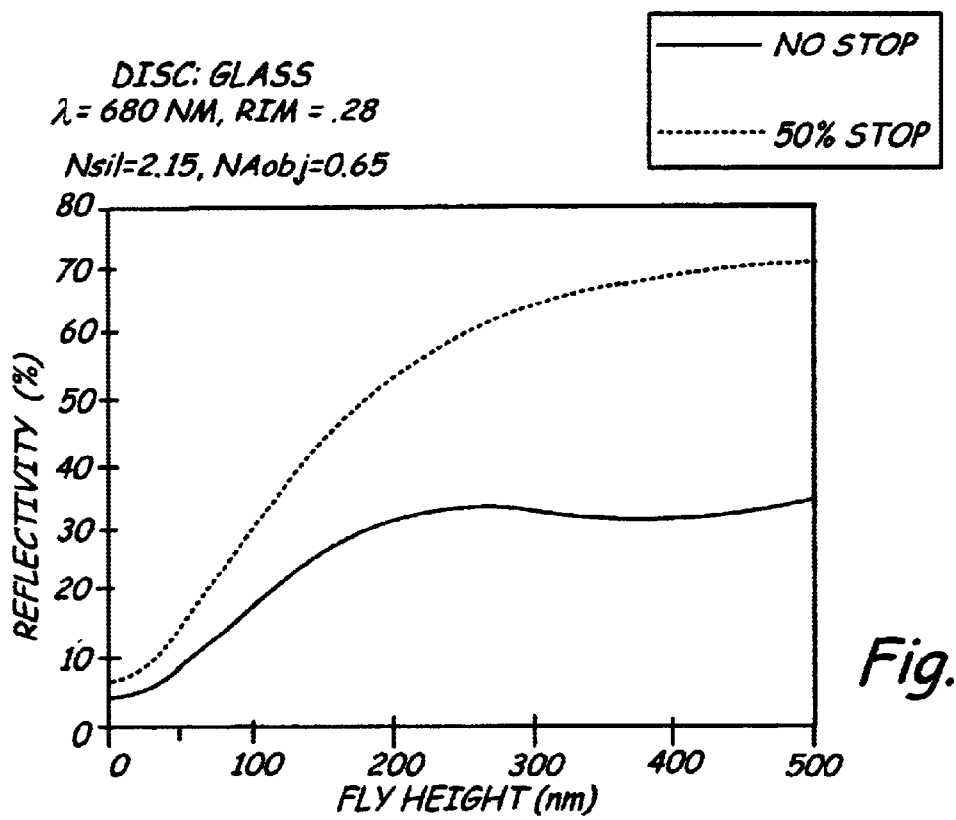
FIG. 10 is a plot of reflectivity as a function of fly height with and without a 50% stop.
Figure 11:
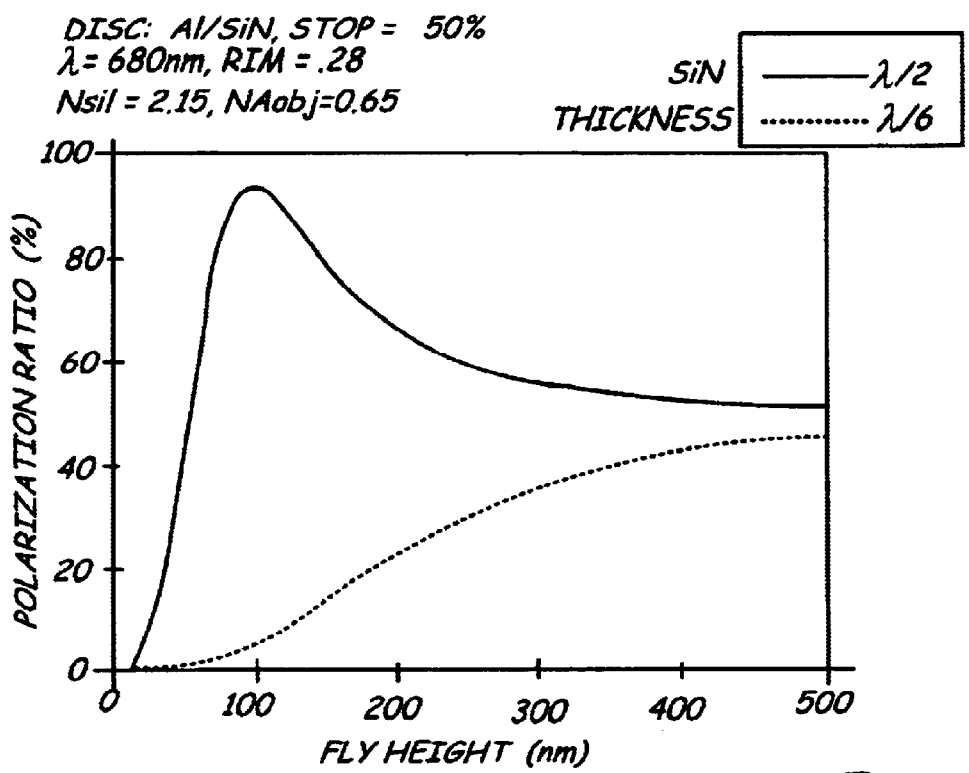
FIG. 11 is a plot of polarization ratio as function of fly height with a 50% stop for two different thicknesses of SiN on the test disc.

The measurement range can be improved significantly with the addition of a central aperture stop either in the incident beam or in the reflected beam prior to the detectors, as shown in FIG. 3. The effect of a 50% stop on a reflectivity measurement can be seen in FIG. 10. The lens for these measurements did not have a SiN coating. The 50% stop corresponds to a pupil radius of 0.707 relative to a maximum clear aperture radius of 1.0. With a numerical aperture of 0.65, the 50% stop increases the effective range to about 500 nm. Referring to FIG. 11, the polarization ratio as a function of fly height was obtained with a 50% stop for two aluminum coated discs having different SiN thicknesses. The 50% stop greatly enhanced the sensitivity of the polarization ratio measurements.

Figure 12:
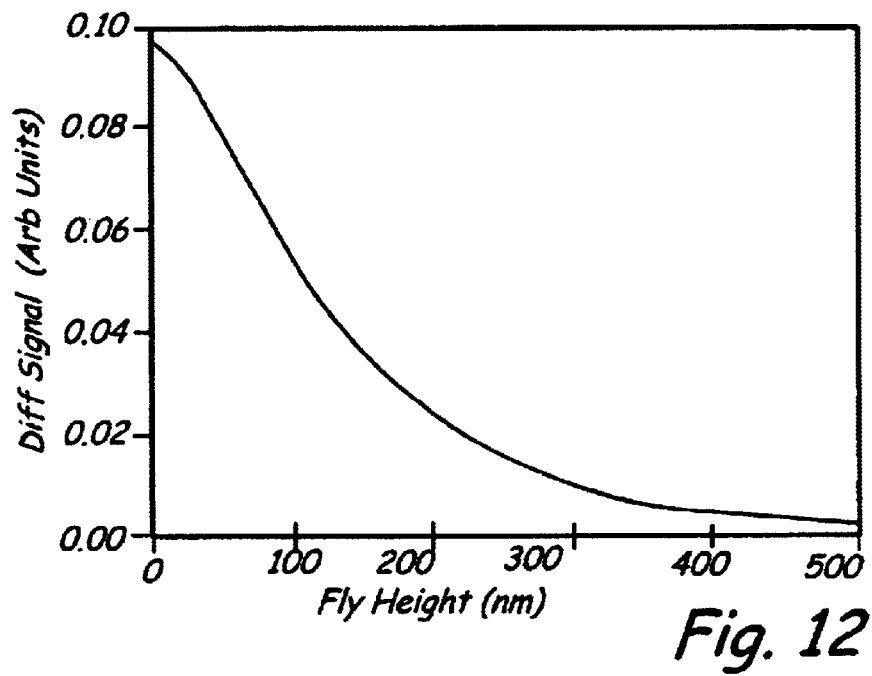
FIG. 12 is a plot of polarization difference as a function of fly height for a disc having an optical stack of magneto-optical material.
Figure 13:
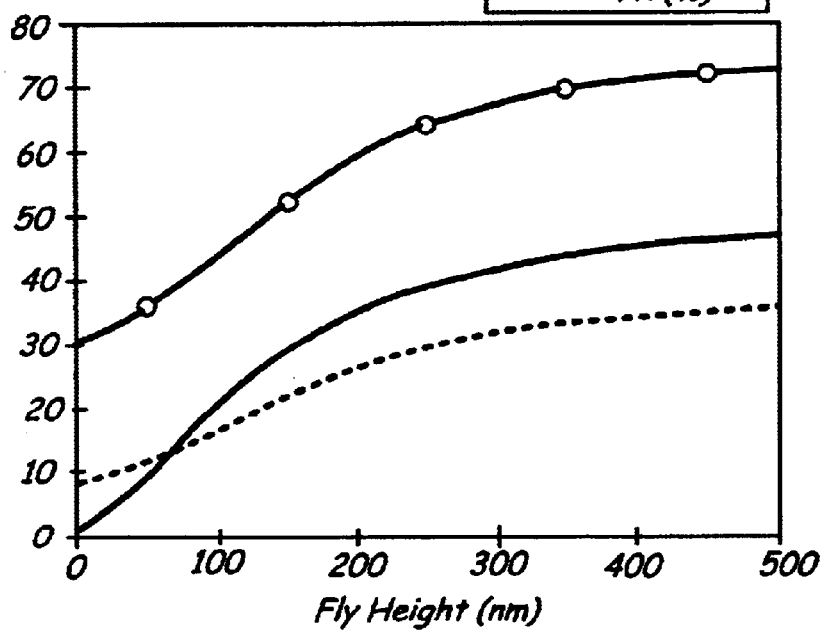
FIG. 13 is a plot of percent reflectance, polarization ratio and polarization sum as a function of fly height obtained with a disc having an optical stack of magneto-optical material.
Figure 14:
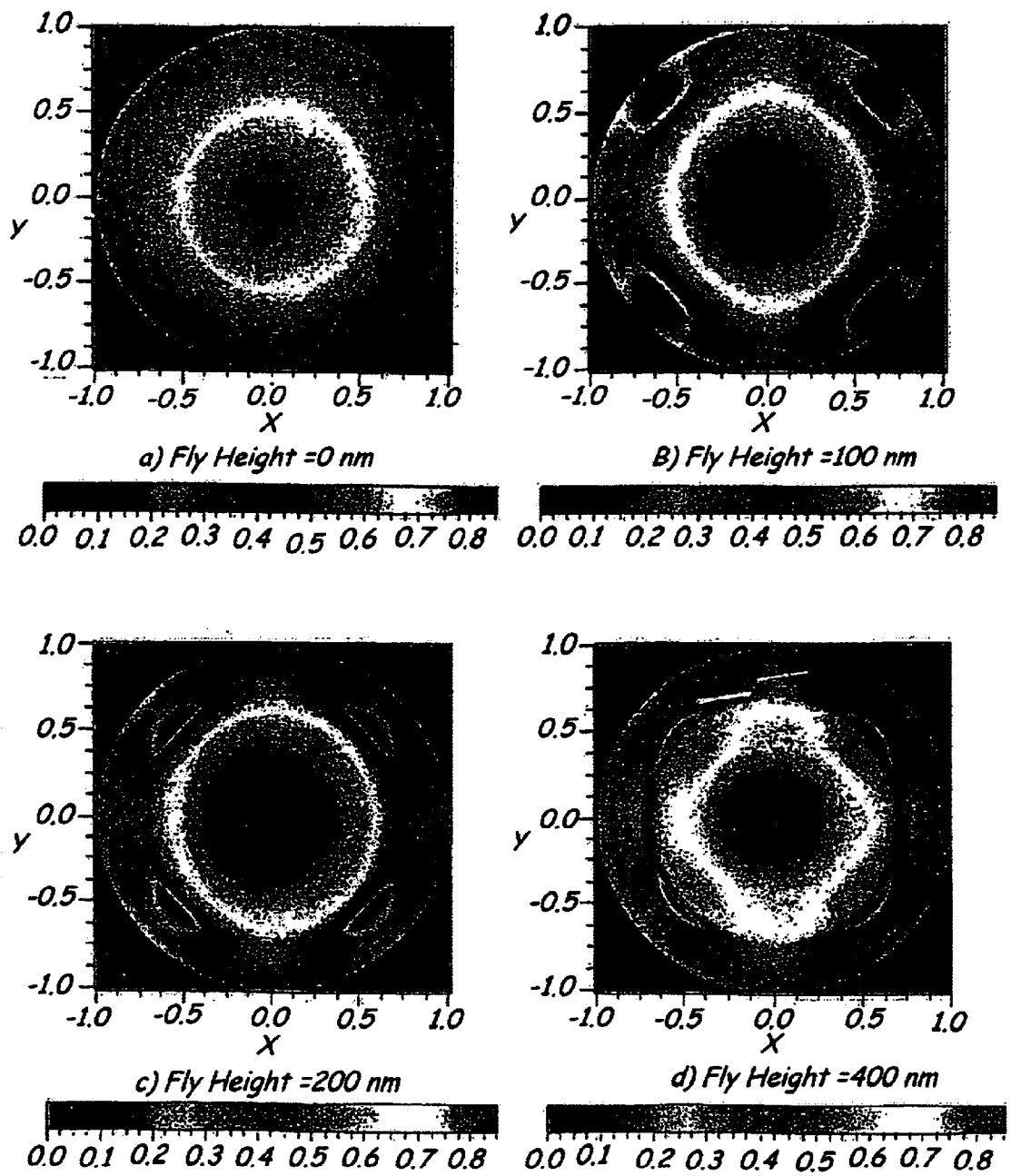
FIG. 14 is a two dimensional plot of intensity of the x-polarized component of reflected light obtained following reflection of an x-polarized incident field for four different fly heights above an aluminum coated disc: a) 0 nm fly height, b) 100 nm fly height, c) 200 nm fly height, and d) 400 nm fly height.
Figure 15:
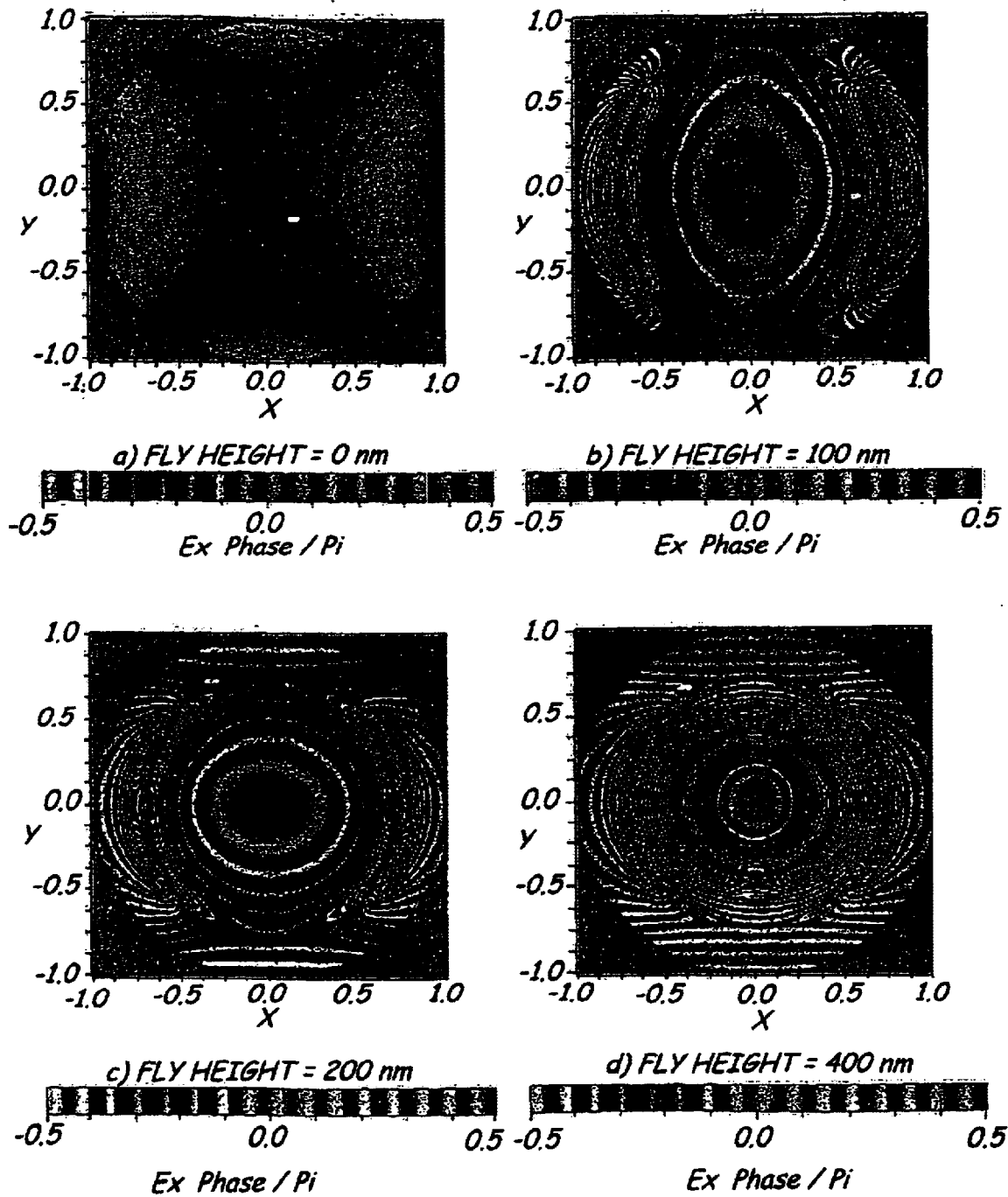
FIG. 15 is a two dimensional plot of phase of the x-polarized component of reflected light obtained following reflection of an x-polarized incident field for four different fly heights above an aluminum coated disc: a) 0 nm fly height, b) 100 nm fly height, c) 200 nm fly height, and d) 400 nm fly height.

Referring to FIG. 12, measurements of polarization differences were made as a function of fly height with a disc coated with an optical stack containing MO media. Similar measurements of percent reflectivity (REF), percent sum, and polarization ratio are presented in FIG. 13. "Reflectivity" is the total intensity of the beam returning through the lens, while "sum" is the is the total intensity measured after reflection from a partially polarizing beam splitter. These measurements were made with a 50% stop in the reflected beam. All of the measurements shown in FIGS. 14 and 15 show good characteristics indicating their suitableness for measurements up to about 500 nm fly height.

A third embodiment of detector module 106 is depicted in FIG. 5. In this embodiment, detector module 106 includes an optional slit aperture 190, a polarizer 192 and a detector array 194. This embodiment can also include an iris diaphragm. Polarizer 192 preferably is oriented at 0, 45 or 90 degrees relative to the initial polarization depending on the measurement desired. The polarizer is rotated between the preferred values or other values to measure the intensity distribution for different polarization states. Similar information can be obtained from a measurement with the polarizer and a second measurement without the polarizer. Detector array 194 can be a CCD array or any other light sensitive array or appropriate dimensions. Detector array 194 can have a one dimensional array or a two dimensional array of light sensitive elements. The intensity pattern measured with detector array 194 will reflect the distance between slider 104 and disc 112.

Other measurements can be used to evaluate the fly height such as intensity distribution, phase distribution and polarization distribution. FIG. 14 depicts intensity distribution of the x-polarized field component of the reflected beam obtained with an aluminum coated test disc and x-polarized incident light. The measurements may be made using an array detector. The intensity distribution is shown for four fly heights. Similarly, FIG. 15 depicts the phase distribution of the x-polarized field component of the reflected beam for four fly heights. Since the intensity distribution and phase distribution vary with fly height these can be used to calculate fly height. In the case of the phase distributions, measurements based on the focus sensor of the detector module in FIG. 3 are particularly suitable measurements for the calculation of fly height.

The embodiments described above are intended to be representative and not limiting. Although the present invention has been described with reference to preferred embodiments, workers skilled in the art will recognize that changes can be made in form and detail without departing from the spirit and scope of the invention. As used herein, "light" or "optical" refers to radiation of any wavelength and are not limited to visible radiation.

What is claimed is:

1. A fly height measurement system for measuring fly height of a slider over a storage disc, the system comprising:

an objective lens and a solid-immersion-lens for focusing light near the bottom of the slider such that the light is coupled to the disc through a near field; and a means for estimating the fly height based on a component of the light, which propagates from the storage disc as the storage disc spins just below the slider.

2. A fly height measurement system for measuring fly height of a slider over a storage disc, the system comprising:

a source of light, which produces light along a light path;

a slider comprising an objective lens and a solid-immersion-lens, wherein the objective lens is positioned such that light from the source hits the objective lens and is directed toward the solid-immersion-lens and couples to the disc surface through a near field;

a detector module to receive light reflected from the disc; and a processor to estimate the fly height of the slider based on detector module output.

3. The measurement system of claim 2 wherein the light from the source is monochromatic or quasi-monochromatic.

4. The measurement system of claim 2 further including a beam splitter in the light path between the light source and the objective lens.

5. The measurement system of claim 4 wherein the beam splitter is a partially polarizing beam splitter.

6. The measurement system of claim 2 wherein the light source comprises a red laser.

7. The measurement system of claim 2 wherein the detector module includes a lens and a two element detector.

8. The measurement system of claim 2 wherein the detector module includes a polarizer.

9. The measurement system of claim 2 wherein the detector module includes a detector array.

10. The measurement system of claim 2 wherein the detector module includes a polarization beam splitter and two light sensitive elements each configured to measure one component of the split beam.

11. The measurement system of claim 2 wherein the detector module includes a central aperture stop.

12. The measurement system of claim 2 wherein the detector module outputs a signal related to the total quantity of reflected light received by the detector module and the processor estimates the fly height based on a comparison of the detector module output with information stored in memory.

13. The measurement system of claim 2 wherein the detector module outputs a signal related to the polarization of reflected light received by the detector module and the processor estimates the fly height based on a comparison of the detector module output with information stored in memory.

14. The measurement system of claim 13 wherein the polarization ratio of the reflected light is evaluated.

15. The measurement system of claim 2 wherein the detector module outputs a signal related to the distribution of intensity, phase or polarization of reflected light received by the detector module and the processor estimates the fly height based on a comparison of the detector module output with information stored in memory.

16. A fly height measurement system for measuring fly height of a slider over a storage disc, the system comprising:

a source of light, which produces light along a light path;

a slider comprising an objective lens and a solid-immersion-lens, wherein the objective lens is positioned such that light from the source hits the objective lens and is directed toward the solid-immersion-lens and couples to the disc surface through a near field;

a detector module to receive a component of the light transmitted through the disc, where the light directed at the detector is not spatially dispersed based on wavelength; and a processor to estimate the fly height of the slider based on an output of the detector module.

17. The measurement system of claim 16 wherein the detector module includes a polarization beam splitter and two light sensitive elements each configured to measure one component of the split beam.

18. The measurement system of claim 16 wherein the detector module includes a central aperture stop.

19. The measurement system of claim 16 wherein the detector module includes a detector array.

* * * * *

UNITED STATES PATENT AND TRADEMARK OFFICE
CERTIFICATE OF CORRECTION

PATENT NO. : 6,688,743 B1
APPLICATION NO. : 09/155460
DATED : February 10, 2004
INVENTOR(S) : James E. Durnin et al.

It is certified that error appears in the above-identified patent and that said Letters Patent is hereby corrected as shown below:

Title page, please insert --(73) Assignee: Seagate Technology, LLC, Scotts Valley, CA (US)--.

Signed and Sealed this

Eighteenth Day of November, 2008

JON W. DUDAS
*Director of the United States Patent and Trademark Office*